United States Patent [19]

York

[11] 4,245,807
[45] Jan. 20, 1981

[54] BUCKET BRACKET

[76] Inventor: Daniel York, 951 E. 52nd, Tacoma, Wash. 98404

[21] Appl. No.: 10,752

[22] Filed: Feb. 9, 1979

[51] Int. Cl.³ .............................. A47F 5/00; A47K 1/08
[52] U.S. Cl. ............................... 248/310; 248/DIG. 7; 248/312.1
[58] Field of Search ................ 248/211, 210, 311.1 A, 248/310, 311.1 R, DIG. 7; 220/18; 119/72

[56] References Cited

U.S. PATENT DOCUMENTS

| | | | |
|---|---|---|---|
| 875,270 | 12/1907 | Irish | 220/18 X |
| 1,929,562 | 10/1933 | Pierce | 248/311.1 A |
| 2,367,256 | 1/1945 | Atkins | 248/311.1 A |
| 2,541,390 | 2/1951 | Weigand | 248/311.1 A |
| 2,699,924 | 1/1955 | Volkmar | 248/311.1 A |
| 2,870,983 | 1/1959 | Booth | 248/311.1 A |
| 3,123,850 | 3/1964 | Piken | 248/311.1 A |
| 3,278,148 | 10/1966 | Denaro | 248/311.1 A |
| 3,279,617 | 10/1968 | Alissandratos | 248/DIG. 7 |
| 3,603,548 | 5/1971 | Meyer | 248/311.1 A |
| 3,979,097 | 9/1976 | Balne | 248/211 |
| 4,071,976 | 2/1978 | Chernewski | 248/311.1 A |
| 4,184,659 | 1/1980 | Abrahmson | 248/DIG. 7 |

Primary Examiner—James T. McCall
Attorney, Agent, or Firm—Kenneth S. Kessler

[57] ABSTRACT

A bucket bracket which is easily secured to a wall or other vertical support is disclosed. The bucket bracket is capable of ease in engagement and disengagement of a bucket for the user merely slips the bucket rim between the vertical mounting support and a curved bracket, whereupon the user lowers the bucket until it rests on the ledge of the bucket bracket with the projecting rim of the bucket secured between the mounting support and the lower curved flange.

5 Claims, 4 Drawing Figures

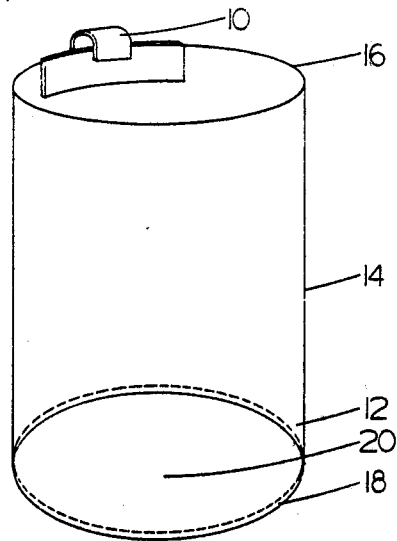
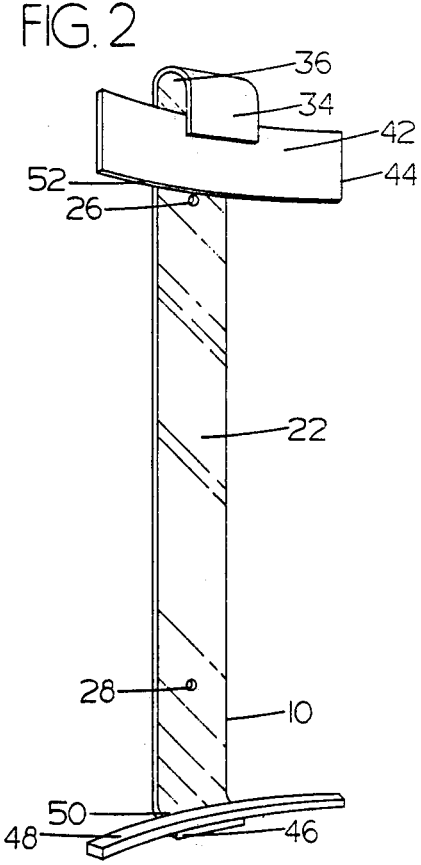
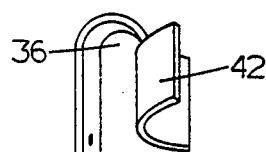
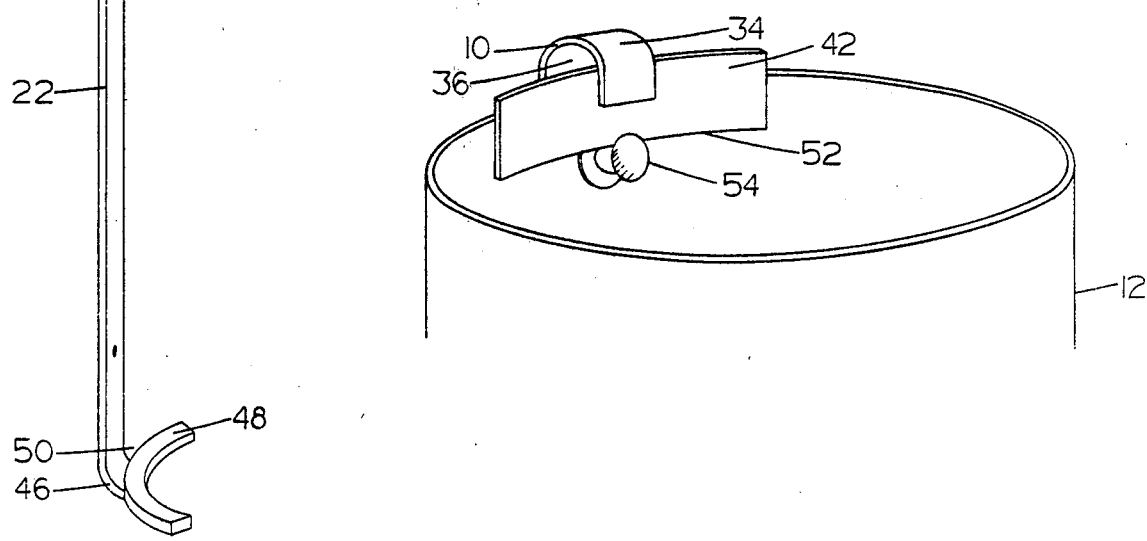

BUCKET BRACKET

BACKGROUND OF THE INVENTION

In both agricultural and industrial uses it is advantageous to be able to secure a bucket to a wall for vertical support. When hanging a bucket in this position it is also advantageous that the bucket be easily engaged or disengaged.

As an example of a particular use, let us consider the watering of a horse in a horse stall. Since the water must be constantly changed, the means of holding the bucket must be capable of easy engagement and disengagement. Also, it is desirable that the procedure for engaging and disengaging the bucket be straight-forward, for often young children perform the task of changing water. It is further advantageous for the procedure not to be complex, for a bucket of water can be a heavy item and not easily manuevered.

A further requirement for an agricultural uses is that the holder be capable of securing a number of standard buckets. By allowing for the use of standard buckets, the user is then able to use surplus items for the watering of horses, etc.

A number of United States Patents have been directed to the holding of articles. In U.S. Pat. No. 2,462,375 by B. R. Falherty an article holder is disclosed. The invention is directed as a holder for cups, cans, and similar items. Thus, the invention is not designed to hold articles of considerable weight. The means of holding the articles secure, is a spring with hooks on either end.

In U.S. Pat. No. 4,071,976 by Chernewski a holding device for potted plants and flower boxes is disclosed. The device comprises an L-shaped vertical support which is affixed to a wall with a horizontal ledge upon which the flower pot or saucer may rest. A down-turned tongue secures the rim of the flower pot. The down-turned tongue slides into position. In the present invention the requirement of an extended horizontal ledge, and the incumbent requirement of strengthening an extended horizontal ledge is prevented by a lower curved flange. The lower curved flange in conjunction with a curved bracket allow the bucket holder to remain effective and compact.

In U.S. Pat. No. 2,578,205 by Ballester a corner suspendable pail and hanger is disclosed. In the Ballester Patent, a specially designed bracket and specially designed bucket meet the requirement of hanging a pail in a corner. The reason for hanging a bucket in a corner is the added security from the two surrounding walls. In the present invention, however, the bucket achieves this capability with a stop within the inner wall of the bucket. The stop abuts the curved retainer bracket which prevents the bucket from accidentally disengaging.

Among the advantages of the present invention is the compactness of the holder. The bucket holder lies essentially flush with the wall on which it is attached unlike the above patents disclosed. This is a particular safety advantage in industrial and agricultural uses for where the bucket is disengaged, a horizontal ledge is left projecting from the wall posing a hazard to persons or animals moving past. Furthermore, an exposed horizontal ledge is vulnerable to damage itself when an animal comes into contact or rubs against the ledge.

A final advantage of the present invention is its ease of manufacture. All components of the holder are easily manufactured and assembled.

BRIEF DESCRIPTION OF THE DRAWINGS

FIG. 1 is a perspective view of the bucket bracket securing a bucket.

FIG. 2 is a front view of the bucket bracket.

FIG. 3 is a side view of the bucket bracket.

FIG. 4 is a perspective view of the stop abutting the bottom edge of the bucket bracket.

DETAILED DESCRIPTION OF THE DRAWINGS

The bucket bracket 10 is illustrated in a perspective view in FIG. 1 securing bucket 12. The bucket 12 is sufficiently secure to prevent most accidental forces from disengaging the bucket 12 from the bucket bracket 10. Thus, it takes the planned moves of a user to disengage the bucket 12.

The bucket 12 is a conventional bucket with vertical cylindrical sides 14. Further, the bucket is open at the top thus leaving a rim 16 about the circumference of the bucket 12. At the bottom of the bucket 12 a cylindrical projecting rim 18 goes about the circumference of the bucket 12 thereby keeping the floor 20 of the bucket 12 off the ground. The above bucket is found often in connection with the transporting of food products to restaurants and other liquids and products. The bucket 12 is often made of plastic and also often a throw-away item.

Running the length of the bucket bracket 10 is the vertical mounting support 22. The vertical mounting support 22 has a means for securing the bucket bracket 10 to wall 24 or other structure. In the preferred embodiment, screw holes 26 and 28 are positioned through the vertical mounting support 22 allowing the screws 20 and 32 to be screwed into the wall 24 thereby securing the vertical mounting support 22.

Affixed to the upper end of the vertical mounting support 22 is the U-shaped extension 34. The U-shaped extension 34 forms an open channel 36 between the outer wall 38 of the U-shaped extension and the vertical mounting support 22.

Secured to the inner face 40 of the outer wall 38 of the U-shaped extension 34 is curved bracket 42. The curved bracket 42 has a curve generally of the same radius as the radius of the rim 16 of the bucket 12. In the preferred embodiment, the curved bracket 42 has generally a wide face 44. Thus, the rim 16 of the bucket is able to slide into the channel 36.

Protruding from the lower end of the vertical mounting support 22 is extension ledge 46. In the preferred embodiment, the extension ledge 46 is merely a formed extension of the vertical mounting support 22. The extension ledge 46 is at approximately right angles with the vertical mounting support 22 and thus approximately horizontal. Affixed to the extension ledge 46 is lower curved flange 48.

Similar to the curved bracket 42, the lower curved flange 48 has a curving surface generally the same radius as the radius of the cylindrical projecting rim 18 and the corresponding vertical cylindrical sides 14.

The lower curved flange 48 is designed to form a lower channel 50 in which the cylindrical projecting rim 18 may be positioned. Since the width of the cylindrical projecting rim 18 is narrow, the width of the lower curved flange 48 is correspondingly narrow. The length of the lower curved flange 48 is sufficient to abutt a significant portion of the cylindrical projecting rim 18.

When an operator wishes to use the bucket bracket 10, the bucket bracket 10 is first secured to a stationary vertical object most often a wall. To secure the bucket 12 to the bucket bracket 10 the rim 16 is slid into the open channel 36 between the outer wall 38 of the U-shaped extension 34 and the vertical mounting support 22. The rim 16 of the bucket 12 is lifted to the top or near the top of the open channel 36. The length of the bucket 12 is less than the distance from top of the channel 36 to the extension ledge 46. Thus, after the rim 16 of the bucket 12 has been positioned near the top of the channel 36, the bucket 12 may be lowered until the cylindrical projecting rim 18 is lowered into the lower channel 50 until the cylindrical projecting rim 18 rests on the extension ledge 46.

The distance between the lower edge 52 of the curved bracket 42 and the lower curved flange 48 is less than the length of the bucket 12. Thus, when the cylindrical projecting rim 18 rests on the extension ledge 46, the bucket 12 is secured. The cylindrical projecting rim 18 positioned in the lower channel 50 is secured between the lower curved flange 48 and the vertical mounting support 22. Similarly, the rim 16 and vertical cylindrical sides 14 are secured in open channel 36 between outer wall 38 of the U-shaped extension 34 and the vertical mounting support 22. Thus, the bucket 12 cannot be disengaged by merely pulling the bucket 12 horizontally away from the wall 24.

To disengage the bucket, the user merely lifts the rim 16 towards the top of the channel 36. Once the rim 16 is in this position, the cylindrical projecting rim 18 has cleared the lower curved flange 48 and the user may swing the cylindrical projecting rim 18 away from the vertical mounting support 22. Once the cylindrical projecting rim 18 has swung away from the vertical mounting support 22 a distance greater than the distance from the vertical mounting support 22 to the edge of the lower curved flange 48, the bucket 12 is lowered. The bucket 12 is lowered until the rim 16 is free from the curved bracket 42. Once this is accomplished, the bucket 12 is free.

The above bucket bracket 10 can be adapted to both industrial and agricultural uses. In agricultural uses, the bucket 12 is best utilized as a water bucket. In this use an animal could accidentally cause the disengagement of the bucket 12. An accidental disengagement could also happen in industrial uses. The possibility of accidental disengagement is slight in both uses, but to prevent even the slight chance of accidental disengagement, a vertical stop 54 is secured within the vertical cylindrical sides 14.

The vertical stop 54 is formed by bolt 56 which has a wide head 58. Surrounding the bolt 56 is cylindrical spacer 60. Cylindrical spacer 60 abuts at one end the bolt head 58 and at the other end washer 62. Washer 62 abutts the inside of the vertical cylinder side 14.

The bolt 56 extends through hold 64 in the vertical cylindrical side 14 and is secured to the outside of the vertical cylindrical side 14 by washer 66 and nut 68. The hole 64 is positioned through the vertical cylindrical side 14 at a distance from the bucket rim 16 which allows the lower edge of the curving bracket 52 to slide over the vertical stop 54. The vertical stop 54, however, is also positioned such that the bucket rim 16 cannot be lifted vertically into channel 36.

To disengage a bucket 12 with the vertical stop 54 in place, the bucket 12 is rotated such that the vertical stop and the lower edge 52 of the curved bracket 42 no longer abutt. Once this is accomplished the bucket 12 is disengaged in the manner set forth above.

To engage a bucket 12 to the bucket bracket 10, when the vertical stop 54 is affixed to the vertical cylindrical sides 14 of the bucket 12, the rim 16 is lifted to the top or near the top of the open channel 36. This procedure is the same as with a bucket 12 which does not have a vertical stop 54, which the one exception that the vertical stop 54 is rotated such that when the rim 16 is lifted into the open channel 36 the vertical stop does not come into contact with the curved bracket 42.

After the rim 16 has been positioned near the top of the channel 36, the bucket is lowered until the cylindrical projecting rim 18 is resting on the extension ledge 46. In this position, the vertical stop is not abutting the curved bracket 42 but is at a position off to the side. Thus, the bucket 12 is rotated swinging the vertical stop 54 into a position abutting the lower edge 52 of the curved bracket 42. Once in this position the bucket cannot be disengaged unless the user goes through the steps as outlined above.

Although a particular preferred embodiment of the invention has been disclosed above for illustrative purposes it will be understood that variations and modifications thereof which lie within the scope of the appended claims are contemplated.

I claim:
1. A bucket bracket comprising:
   a mounting support;
   a curved bracket;
   a means of securing the curved bracket to the mounting support wherein a open channel is formed between the curved bracket and the mounting support;
   a curved flange;
   a means of securing the curved flange to the mounting support at a position on the mounting support opposite the means of securing the curved bracket wherein an open channel is formed between the curved flange and the mounting support.
2. A bucket bracket of claim 1 wherein the means of securing the curved bracket to the mounting support comprises a U-shaped extension.
3. The bucket bracket of claim 2 wherein the means of securing the curved flange to the mounting support comprises a ledge.
4. A bucket and bucket bracket comprising:
   a cylindrical bucket;
   a mounting support;
   a curved bracket;
   a means of securing the curved bracket to the mounting support wherein an open channel is formed between the curved bracket and the mounting support;
   a curved flange;
   a means of securing the curved flange to the mounting support at a position on the mounting support opposite the means of securing the curved bracket wherein an open channel is formed between the curved bracket and the mounting support; and
   a stop affixed to the inner wall of the bucket wherein the stop is at a height within the inner cylindrical bucket wall such that when the bucket is rotated to a position where the stop is below the curved bracket, the stop abutts the lower edge of the curved bracket.

5. The bucket and bucket bracket of claim 4 wherein the stop comprises:

a bolt with a large diameter head;
a cylindrical spacer surrounding the bolt;
a bucket with a hole for the reception of the bolt; and
a nut to secure the bolt to the cylindrical bucket wall.

* * * * *